United States Patent [19]

Bornert

[11] 4,045,524

[45] Aug. 30, 1977

[54] INSTALLATIONS FOR WASHING A POLLUTED GAS

[75] Inventor: Paul Bornert, La Celle Saint-Cloud, France

[73] Assignee: Air-Industrie, France

[21] Appl. No.: 682,595

[22] Filed: May 3, 1976

Related U.S. Application Data

[63] Continuation of Ser. No. 451,681, March 15, 1974, abandoned.

[30] Foreign Application Priority Data

Mar. 20, 1973 France ............................ 73.09949

[51] Int. Cl.² ........................................ B01D 47/00
[52] U.S. Cl. ................................. 261/112; 55/240; 98/115 SB; 261/118; 261/DIG. 54
[58] Field of Search ............... 261/110, 115, DIG. 54, 261/DIG. 44, 112, 118, 78 A, 111; 55/238, 240, 241; 98/115 SB; 118/DIG. 7

[56] References Cited

U.S. PATENT DOCUMENTS

| | | | |
|---|---|---|---|
| 2,127,908 | 8/1938 | Fischer | 261/110 |
| 3,100,810 | 8/1963 | Meyer | 261/115 |
| 3,168,030 | 2/1965 | Wilhelmsson et al. | 98/115 SB |
| 3,168,031 | 2/1965 | Wilhelmsson et al. | 98/115 SB |
| 3,170,384 | 2/1965 | Krantz et al. | 98/115 SB X |
| 3,317,197 | 5/1967 | Lohner et al. | 261/DIG. 54 |
| 3,390,400 | 6/1968 | Dock | 261/DIG. 44 |
| 3,529,941 | 9/1970 | Tobiassen et al. | 261/115 X |
| 3,628,311 | 12/1971 | Costarella et al. | 55/240 X |
| 3,795,093 | 2/1974 | Gerhard et al. | 261/DIG. 54 |
| 3,884,654 | 5/1975 | DeCrevoisier et al. | 261/112 X |
| 3,934,495 | 1/1976 | Bloomer | 98/115 SB |

*Primary Examiner*—Tim R. Miles
*Assistant Examiner*—Richard L. Chiesa
*Attorney, Agent, or Firm*—Larson, Taylor and Hinds

[57] ABSTRACT

The installation comprises at least one trickling channel oriented vertically and whose cross-section diminishes from above to below. A transverse wall is arranged below the lower end of this trickling channel. The invention is applicable to the air coming from painting cabins.

11 Claims, 8 Drawing Figures

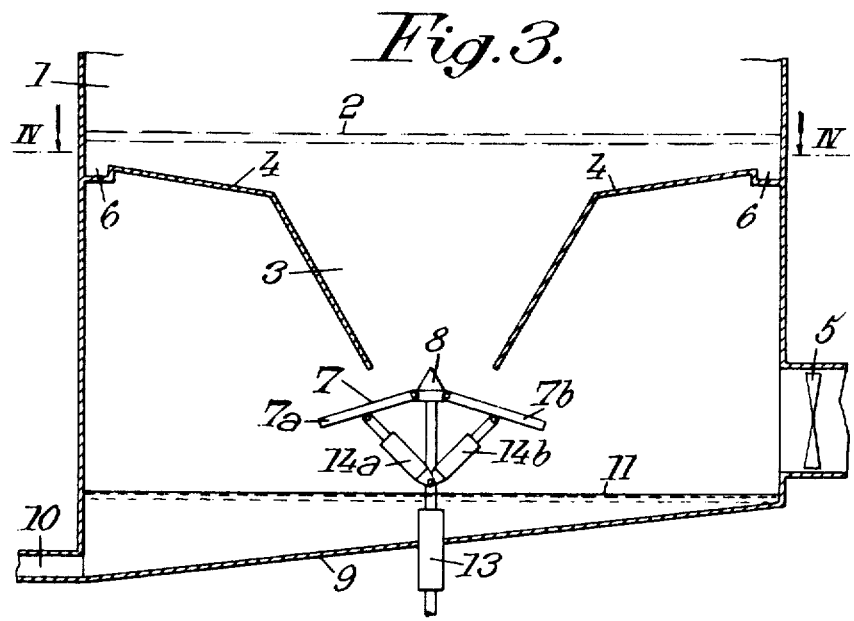
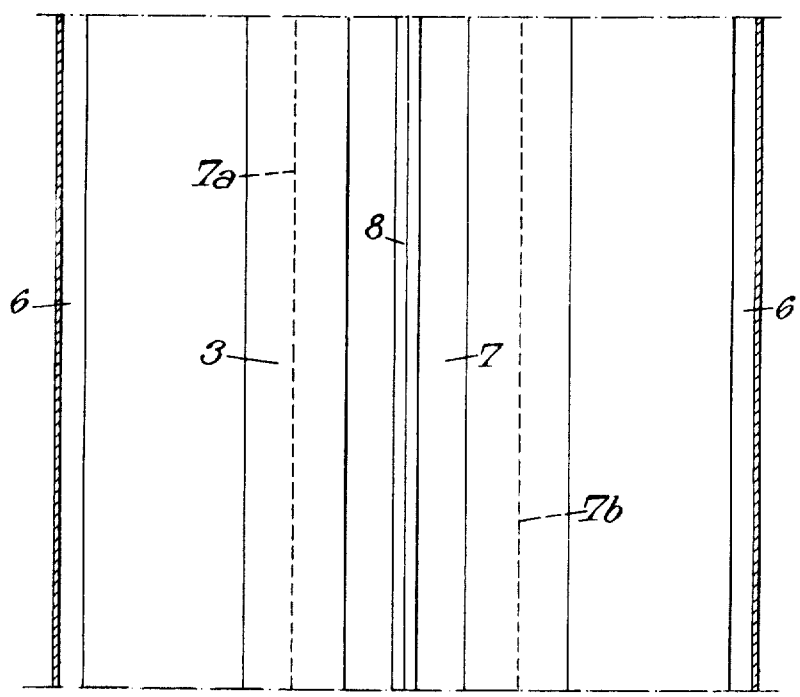

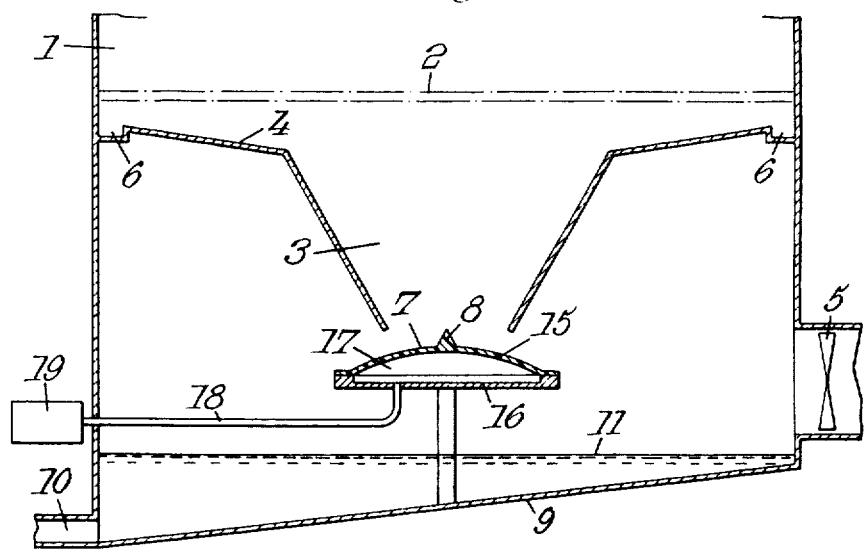
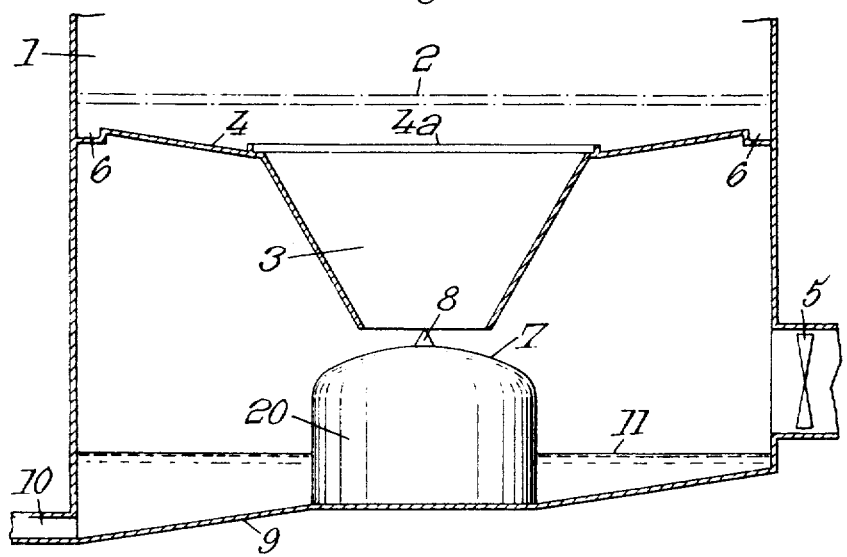

INSTALLATIONS FOR WASHING A POLLUTED GAS

This is a continuation of application Ser. No. 451,681 filed Mar. 15, 1974, now abandoned.

The invention relates to installations for washing a polluted gas, that is to say installations in which polluted gas is constrained to traverse at least one or several layers of a washing liquid.

Such installations comprise, for this purpose, at least one thrickling channel oriented vertically and whose cross-section diminishes from above to below, means for circulating polluted gas from above to below in this trickling channel, and distributing devices to cause the washing liquid to trickle over a portion at least of the inner walls of this trickling channel, so that the washing liquid is detatched from all or part of the edge of the lower end of the trickling channel in the form of one or several sheets.

The invention relates more particularly, because it is in this case that its application seems to have the most advantage, but not exclusively, among these installations to those for trapping solid and/or liquid particles in suspension in a polluted gas, especially when it relates to fine paint particles (paint fog) which occur in the air extracted from painting cabins, more particularly painting cabins used in the automobile industry for the painting of car bodies.

In an installation of this type, the sheet of liquid formed by the washing liquid which is detatched from the inner walls of the trickling channel, at the level of its lower end, is projected into the polluted gas to be sprayed and to trap by mechanical and/or chemical effects the impurities polluting said gas; in particular when it relates to a gas containing solid and/or liquid particles in suspension, said particles are trapped mechanically by the sheet of washing liquid.

The efficiency of trapping depends on the continuous character of the sheet of washing liquid and it will be appreciated that tears in this sheet cause a drop in trapping efficiency, since the polluted gas which passes through these tears does not undergo any washing.

It has already been suggested, in known installations, to make the trickling channel open above a reserve of washing liquid constituted by a receiver basin in which the washing liquid is accumulated to form a free surface onto which the sheet of washing liquid falls. It is not possible to arrange the lower end of the trickling channel too close to this free surface since there is then produced an entrainment of the washing liquid contained in the receiver basin by the gas flowing in the trickling channel, this gas then contains a large amount of washing liquid and it is no longer possible to discard it to the atmosphere. On the other hand, if an arrangement is adopted by which the lower end of the trickling channel is located at a distance from the free surface of the washing liquid in the receiver basin, tears in the sheet of washing liquid would be produced, and the efficiency of trapping would be reduced.

It is accordingly an object of the present invention to overcome the above-mentioned drawbacks.

The installation according to the invention comprises at least one trickling channel oriented vertically and whose cross-section diminishes from above to below, means for causing the polluted gas to flow from above to below in this trickling channel, and distributor means to cause the washing liquid to trickle over a portion at least of the inner walls of this trickling channel, and it is characterised by the fact that it comprises, in addition, at least one transverse wall arranged below the lower end of the trickling channel and having a continuous or discontinuous contour similar to (equal or preferably greater than) the continuous or discontinuous contour of the lower end of the abovesaid trickling channel.

It will then be appreciated that the polluted gas is constrained to traverse the annular section extending from the contour of the lower end of the trickling channel to the transverse wall, this annular section being able to present an optimal value (for which the one or more sheets of washing liquid are free from tearing) independently of the position of the collection device for the washing liquid disposed below, especially independently of the position of the receiver basin.

According to an advantageous feature of the invention, the transverse wall has a central protuberance extending in the direction of the trickling channel and ending substantially at the level of its lower end.

According to another advantageous feature of the invention, first adjustment means can be provided to vary the distance separating the transverse wall from the lower end of the trickling channel.

According to yet another advantageous feature of the invention, second adjustment means may be provided to modify the shape of the transverse wall.

According to an additional feature of the invention, the continuous or discontinuous contour of the lower end of the trickling channel may be provided with a complementary wall constituted by, on one hand, a lower portion extending transversely beyond the extension of the wetted side of the wall of the trickling channel and bounding with the abovesaid contour a separating slot, and on the other hand, an upper portion extending upwardly from the dry side of the wall of the trickling channel and bounding with this dry side an upwardly open reserve space and placed in communication with a zone of the installation under suction with respect to the lower end of the trickling channel.

The invention consists, apart from the features which have just been discussed, of certain other features which are preferably used at the same time and which will be more explicitly considered below.

The invention will in any case be well understood by means of the additional description which follows as well as of the accompanying drawings, which description and drawings relate to preferred embodiments of the invention and do not of course imply any limiting character.

FIG. 1 of these drawings in a cross-section of a painting cabin constructed according to a first embodiment of the invention.

FIG. 3 is a transverse section of a painting cabin constructed according to a second embodiment of the invention.

FIG. 4 is a section along the line IV—IV of FIG. 3.

FIG. 5 is a cross-section of a painting cabin constructed according to a third embodiment of the invention.

FIG. 6 is a cross-section of a painting cabin constructed according to a fourth embodiment of the invention.

Figure 8:
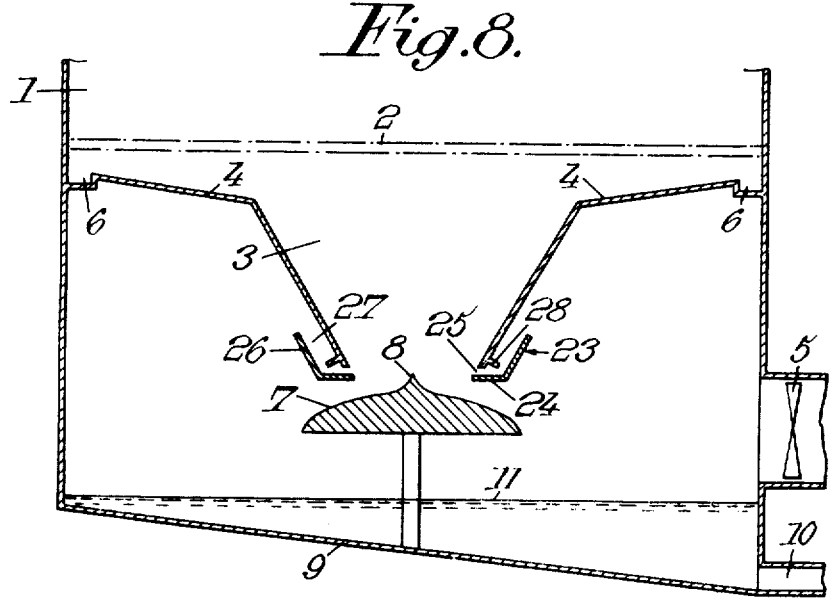

FIG. 8, lastly, is a cross-section of a painting cabin constructed according to a sixth embodiment of the invention.

The installation described below and illustrated by the abovesaid drawings will be assumed to be, by way of example, a painting cabin such as a painting cabin used in the automobile industry for the painting of body work.

This painting cabin comprises an enclosure 1 in which the painting of car bodies is carried out, the floor 2 of this enclosure 1 being constituted at least in part by a grating through which air loaded with paint fog is extracted.

Figure 1:
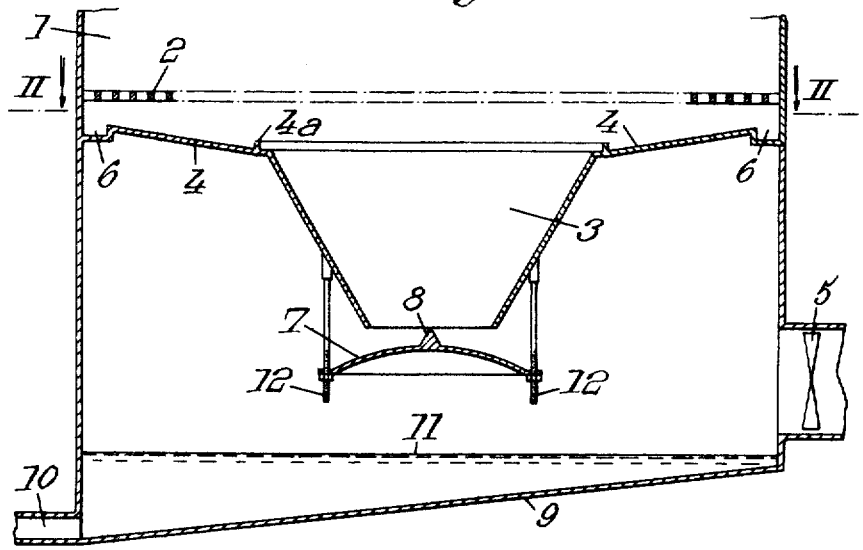
Figure 2:
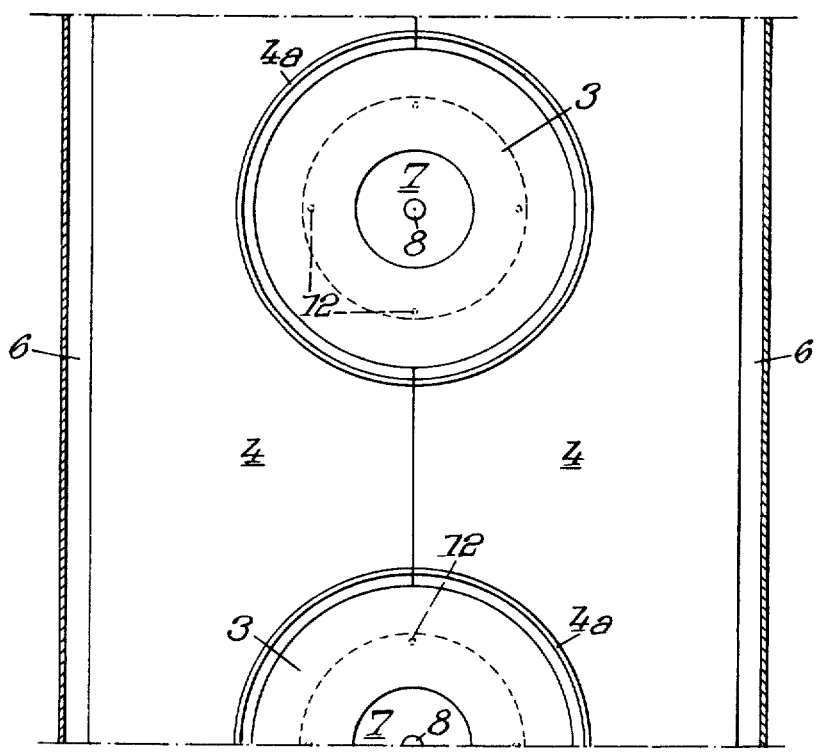
FIG. 2 is a section along the line II—II of FIG. 1.

Below this floor 2 is arranged, generally along the axis of the enclosure 1, at least one trickling channel 3 oriented vertically and whose cross-section diminishes from above to below. This trickling channel 3 can have a circular cross-section (as shown in FIGS. 1 and 2) or rectangular (as shown in FIGS. 3 and 4).

When the trickling channel has a circular section, the painting cabin includes several trickling channels 3 distributed longitudinally.

When the trickling channel 3 has a rectangular section, the painting cabin can include a single trickling channel 3 extending over the whole of its length, or several trickling channel 3 distributed longitudinally and having their large sides parallel to the axis of the cabin.

In the majority of cases, the upper end of the channel 3 is connected with the lateral walls of the enclosure 1 by inclined planes 4.

The means for causing the air loaded with paint fog to flow in the trickling channel 3 are generally constituted by one or several extraction fans 5 sucking the air extracted from the enclosure 1 through the floor 2 by means of the trickling channel 3.

This being the case, there are provided distributing devices 6 to cause a washing liquid constituted by water to flow over a portion at least of the inner walls of the trickling channel 3.

Advantageously, the distributing devices 6 are constituted by overflow gutters situated along the lateral walls of the enclosure 1 and discharging onto the inclined planes 4 terminating at the upper end of the trickling channel 3, so that washing water can trickle over part at least of the inner walls of the abovesaid trickling channel 3.

In certain cases, the inclined planes 4 can comprise retaining rims 4a, improving the distribution of washing water.

The washing water hence detaches itself from all or part of the edge of the lower end of the trickling channel 3 in the form of one or several sheets.

According to the invention, there is provided at least one transverse wall 7 arranged below the lower end of the trickling channel 3 and having a continuous or discontinuous contour similar to or greater than the continuous or discontinuous contour of the lower end of the trickling channel 3.

When the trickling channel 3 has a circular section (FIGS. 1 and 2), the transverse wall 7 has a circular contour whose diameter is greater than that of the lower end of the trickling channel 3.

When the trickling channel 3 has a rectangular section (FIGS. 3 and 4), the transverse wall 7 has a rectangular contour whose width is greater than that of the lower end of the trickling channel 3.

According to an advantageous feature of the invention, the transverse wall 7 (whatever the shape of the trickling channel 3) has a central protuberance extending in the direction of the trickling channel 3 and ending substantially at the level of its lower end.

The role of this central protuberance 8 is to facilitate the change in direction of the air at the outlet from the trickling channel 3 and to limit pressure drops.

Moreover, this central protuberance 8 enables an accumulation of paint to be avoided which would be produced in the central portion of the transverse wall 7 if said central portion were smooth, that is to say substantially perpendicular to the direction of the air in the central zone of the trickling channel.

In certain cases, it may even be contemplated to extend this central protuberance inside the trickling channel 3.

It has been indicated above that due to the transverse wall 7 the air loaded with paint fog was constrained from traversing the annular section extending from the contour of the lower end of the trickling channel 3 up to this transverse wall 7.

This annular section can hence have an optimal value (for which the one or more sheets of washing water are free of tearing), independently of the position of the washing water collection device arranged below the enclosure 1.

This collection device is generally constituted by a receiving basin 9 whose lower part is provided with a washing water removal orifice 10.

The flow-rate of removed washing water has, with respect to the flow-rates received, a value such that there is established in the abovesaid receiving basin 9 a free surface 11 whose position is practically without influence on the trapping efficiency by reason of what has just been explained.

In any case, it will be appreciated that the value of the distance separating the transverse wall 7 from the lower end of the trickling channel is very large to obtain maximum trapping efficiency.

To this end, it is therefore advantageous to provide first adjustment means for varying this distance.

In the embodiment shown in FIGS. 1 and 2, these first adjustment means may be constituted by an assembly of the transverse wall 7 on the trickling wall 3, by means of threaded rods 12.

In the embodiment illustrated in FIGS. 3 and 4, these first regulating means may be constituted by an assembly of the transverse wall 7 on the bottom of the receiver basin 9, by means of a jack mechanism 13 (hydraulic jack, pneumatic jack or electric jack).

It may also be advantageous to provide second adjustment means for modifying the shape of the transverse wall 7.

In FIG. 3, there is shown a simple and advantageous embodiment of these second adjustment means; according to this embodiment, the transverse wall 7 is constituted by two flaps 7a and 7b hinged on the central protuberance 8 around longitudinal axes and actuated by jacks 14a and 14b (hydraulic jacks, pneumatic jacks or electric jacks).

As regards the first adjustment means and the second adjustment means, recourse may be had to an advantageous feature of the invention according to which said first and second means are combined; this feature is illustrated in FIG. 5 in which the same reference numerals denote the same members as in FIGS. 1 and 3.

The transverse wall 7 shown in this FIG. 5 is then constituted by a deformable wall 15 fixed in sealed manner on a support 16 so as to define a sealed space 17. This sealed space 17 is connected through a pipe 18 to a source of variable pressure 19 enabling more or less inflation of the abovesaid space.

According to the value of the inflation selected there is obtained, on one hand, a greater or less distance separating the transverse wall 7 from the lower end of the trickling channel 3, and, on the other hand, more or less bulging shape of the transverse wall 7.

This variable inflation enables in addition the obtaining of a breaking-up of the paint which could be deposited on the transverse wall 7; this breaking-up is easily produced when the deformable wall 15 is constituted of fluorine type plastics material or of plastics material of the polyolefine class.

In FIG. 6, in which the same reference numerals denote the same members as in FIGS. 1 and 3, there is shown a particularly simple embodiment of the invention according to which the transverse wall 7 is constituted by one or several blocks of concrete resting on the bottom of the receiver basin 9.

If the trickling channel 3 is circular, the concrete block 20 may be constituted by a circular stud arranged below the trickling channel 3.

If the channel 3 is rectangular, the concrete block 20 may be constituted by a succession of rectangular plugs arranged below the trickling channel 3.

As regards the shape to be given to the transverse wall 7, recourse may be had, as shown in FIGS. 1, 3, 5 and 6 to a form such that the said transverse wall 7 has an upwardly turned convex face.

This convex face may be constituted by a bulged surface (FIGS. 1, 5 and 6) or by two flat or substantially flat surfaces forming a dihedral angle (FIG. 3) or again by a conical surface (modification not shown).

Figure 7:
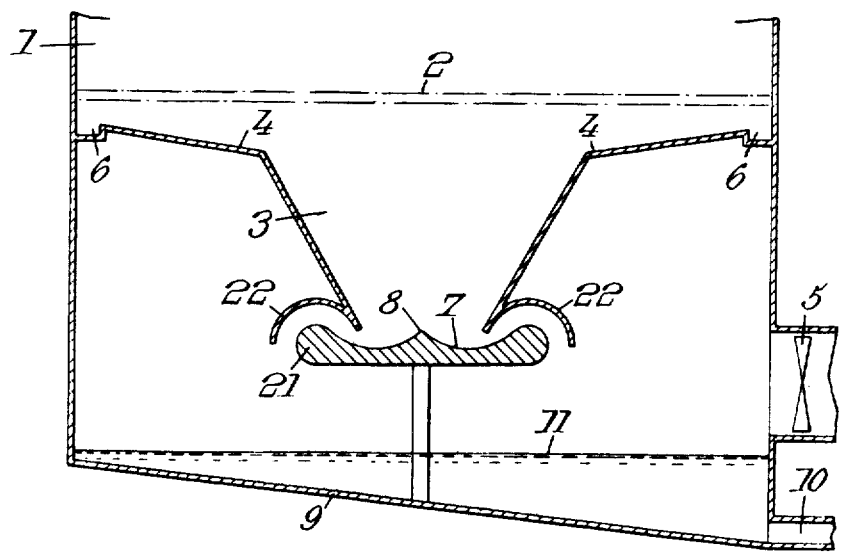
FIG. 7 is a cross-section of a painting cabin constructed according to a fifth embodiment of the invention.

However recourse could also be had, as shown in FIG. 7, in which the same reference numerals denote the same members as in FIGS. 1 and 3, to a form such that the said transverse wall 7 has an upwardly turned concave surface, the central part of this concave surface being occupied by the central protuberance 8.

In this case it is advantageous to include with the transverse wall 7 both in the case where this transverse wall 7 is circular and rectangular, a raised edge 21 rising higher than the lower end of the trickling channel 3.

Due to this arrangement, and when the installation is inactive (no flow of polluted gas), there is obtained a hydraulic joint in the form of a syphon formed by the washing water retained in the transverse wall 7; it is hence possible to obtain a fluid-tightness between the upstream and downstream parts of the installation.

To obtain better trapping efficiency when recourse is had to a transverse wall 7 with a concave surface it is advantageous to arrange above the raised edge 21 of said transverse wall 7, a deflector 22 curved downwardly and whose inner edge is fixed in the vicinity of the lower end of the trickling channel 3. The outer edge of said deflector 22 surrounds the transverse wall 7.

In the foregoing, it is assumed that the transverse wall 7 is constituted by an attached element suspended from the trickling channel 3 or even supported by the bottom of the receiver basin 9.

Of course, and according to a modification (not shown) of the invention, it would be possible to arrange the bottom of the receiving basin especially so that it constitutes, below the lower end of the trickling channel, the transverse wall according to the invention.

In FIG. 8, in which the same reference numerals denote the same members as in FIG. 1 and 3, there is illustrated a complementary feature of the invention according to which the continuous or discontinuous contour of the lower end of the trickling channel 3 can be provided with a complementary wall 23 constructed according to French Pat. No. 71 03650 filed Feb. 3, 1971 by the Company TUNZINI SAMES.

This complementary wall 23 is constituted by, a lower part 24 extending transversely beyond the extension of the wetted side of the wall of the trickling channel 3 and bounding with the abovesaid contour a separating slot 25, and an upper part 25 extending upwardly from the dry side of the wall of the trickling channel 3 and bounding with this dry side a reverse volume 27 open upwardly and in communication with a zone of the installation under suction with respect to the lower end of the trickling channel 3.

Advantageously, there may be provided a retaining wall 28 arranged above the separating slot 25 and extending from the wall of the trickling channel 3 to the complementary wall 23 so as to bound with said complementary wall 23 a section of passage enabling flow of washing water.

This retaining wall 28 bounds with the wall of the trickling channel 3 a dead space in which gas bubbles which are formed at the level of the separating slot 25 can be temporarily retained.

In any case, and whatever the embodiment adopted, there is provided an installation in which the presence of one or several transverse walls provides a certain number of advantages among which may be mentioned those summarized by the following points:

the trapping efficiency is improved by the presence of the transverse wall which avoids the entrainment of washing water by the flow of air;

the presence of the transverse wall reduces the formation of foam in the washing water contained in the receiving basin;

due to the shape given to the transverse wall, it is possible to obtain a better guidance of the air and to reduce pressure drops;

it is possible to reduce the height of the part of the installation situated below the grating of the painting cabin.

From the constructional point of view, the fact of providing a transverse wall does not present difficulty and does not result in a considerable increase in the price of the installation, since this transverse wall can be produced very simply, and may be constituted of plastics material, indeed even of concrete.

It will be noted that, as shown in the drawings for each embodiment, the distance between the uppermost major surface of the transverse wall and the lowermost end of the trickling filter is less than the width of the opening at the lowermost end of the trickling channel.

From the point of view of maintenance of the installation, the presence of a transverse wall does not involve any complication, since it is in the majority of cases possible to provide assembly and disassembly means for this transverse wall.

As is self-evident, and as emerges already from the foregoing, the invention is in no way limited to those of its types of application and embodiments which have been more especially envisaged; it encompasses, on the contrary, all modifications.

I claim:

1. Installation for washing a polluted gas comprising a vertically oriented trickling channel, the cross-section of which diminishes from above to below and which includes an opening at the lowermost end thereof, said opening being situated in a substantially horizontal plane, distributing means for causing washing liquid to trickle over the inner walls of said trickling channel in the form of a film so that the washing liquid detaches itself from the edge of the lower end of the trickling channel in the form of a sheet, at least one transverse wall situated in a substantially horizontal plane and extending across substantially the entire width of said opening, said transverse wall being arranged below the lower end of the trickling channel so that said sheet of liquid impinges directly thereon and having a continuous or discontinuous contour similar to the continuous or discontinuous contour of the lower end of said trickling channel, and means for circulating the polluted gas from above to below in said trickling channel such that said gas passes through said channel inwardly of said film of washing liquid and contacts and passes through said sheet of washing liquid, the distance between the uppermost major surface of said transverse wall and the lowermost end of the trickling channel being less than the width of the opening at the lowermost end of the trickling channel and said transverse wall cooperating with the lowermost end of the trickling channel to defined an area therebetween of such a shape and size that the sheet between the lower end of the trickling channel and said transverse wall is substantially free from tearing.

2. Installation according to claim 1, wherein the contour of the transverse wall is greater than the contour of the lower end of the trickling channel.

3. Installation according to claim 1, wherein the transverse wall has a central protuberance extending in the direction of the trickling channel and ending at the level of its lower end.

4. Installation according to claim 3, wherein the central protuberance extends inside the trickling channel.

5. Installation according to claim 1, wherein first regulating means are provided to vary the distance separating the transverse wall from the lower end of the trickling channel.

6. Installation according to claim 1, wherein second regulating means are provided to modify the form of the transverse wall.

7. Installation according to claim 6, wherein first regulating means are provided to vary the distance separating the transverse wall from the lower end of the trickling channel, said first and second regulating means being combined.

8. Installation according to claim 5, wherein the first regulating means are constituted by an assembly of the transverse wall on the trickling channel by means of threaded rods.

9. Installation for treating a polluted gas containing solid and/or liquid particles, said installation comprising a vertically oriented trickling channel the cross-section of which diminishes from above to below and which includes an opening in the lowermost end thereof, said opening being situated in a substantially horizontal plane, distributing means for causing washing liquid to trickle over the inner walls of said trickling channel in the form of a film so that the washing liquid detaches itself from at least part of the edge of the lower end of the trickling channel in the form of a sheet, at least one transverse wall situated in a substantially horizontal plane and extending across at least substantially the entire width of said opening, said transverse wall being arranged below the lower end of the trickling channel so that said sheet of liquid impinges directly thereon and having a continuous or discontinuous contour similar to the continuous or discontinuous contour of the lower end of said trickling channel, and means for circulating the polluted gas from above to below in said trickling channel such that said gas passes through said channel inwardly of said film of washing liquid and contacts and passes through said sheet of washing liquid, the distance between the uppermost surface of said transverse wall and the lowermost end of the trickling channel being less than the width of the opening at the lowermost end of the trickling channel and said transverse wall cooperating with the lower end of the trickling channel to define an area therebetween of such a shape and size that the sheet between the lowermost end of the trickling channel and said transverse wall is substantially free from tearing.

10. Installation for treating a polluted gas containing a paint mist in suspension, said installation comprising vertically oriented trickling channel the cross-section of which diminishes from above to below and which includes an opening at the lowermost end thereof, said opening being situated in a substantially horizontal plane distributing means for causing washing liquid to trickle over the inner walls of said trickling channel in the form of a film so that the washing liquid detaches itself from at least part of the edge of the lower end of the trickling channel in the form of a sheet, and at least one transverse wall situated in a substantially horizontal plane and extending across at least substantially the entire width of said opening, said transverse wall being arranged below the lower end of the trickling channel so that said sheet of liquid impinges directly thereon and having a continuous or discontinuous contour similar to the continuous or discontinuous contour of the lower end of said trickling channel, and means for circulating the polluted gas from above to below in said trickling channel such that said gas passes through said channel inwardly of said film of washing liquid and contacts and passes through said sheet of washing liquid, the distance between the uppermost surface of said transverse wall and the lowermost end of the trickling channel being less than the width of the opening at the lowermost end of the trickling channel and said transverse wall cooperating with the lowermost end of the trickling channel to define an area therebetween of such a shape and size that the sheet between the lowermost end of the trickling channel and said transverse wall is substantially free from tearing.

11. Installation for washing a polluted gas comprising a vertically oriented trickling channel, the cross-section of which diminishes from above to below and which includes an opening at the lowermost end thereof, said opening being situated in a substantially horizontal plane, distributing means for causing washing liquid to trickle over the inner walls of said trickling channel in the form of a film so that the washing liquid detaches itself from the edge of the lower end of the trickling channel in the form of a sheet, receiver means forming a liquid surface, at least one transverse wall situated in a substantially horizontal plane and extending across at least substantially the entire width of said opening, said transverse wall being arranged between the lower end of the trickling channel and said liquid surface so that said sheet of liquid impinges directly thereon and having a continuous or discontinuous contour of the lower end of said trickling channel, and means for circulating the polluted gas from above to below in said trickling channel such that said gas passes through said channel inwardly of said film of washing liquid and contacts and passes through said sheet of washing liquid, the distance between the uppermost major surface of said transverse wall and the lowermost end of the trickling channel being less than the width of the opening at the lowermost end of the trickling channel and said transverse wall cooperating with the lower end of the trickling channel to define an area therebetween of such a shape and size that the sheet between the lowermost end of the trickling channel and said transverse wall is substantially free from tearing.

* * * * *